United States Patent Office 2,921,284
Patented Jan. 12, 1960

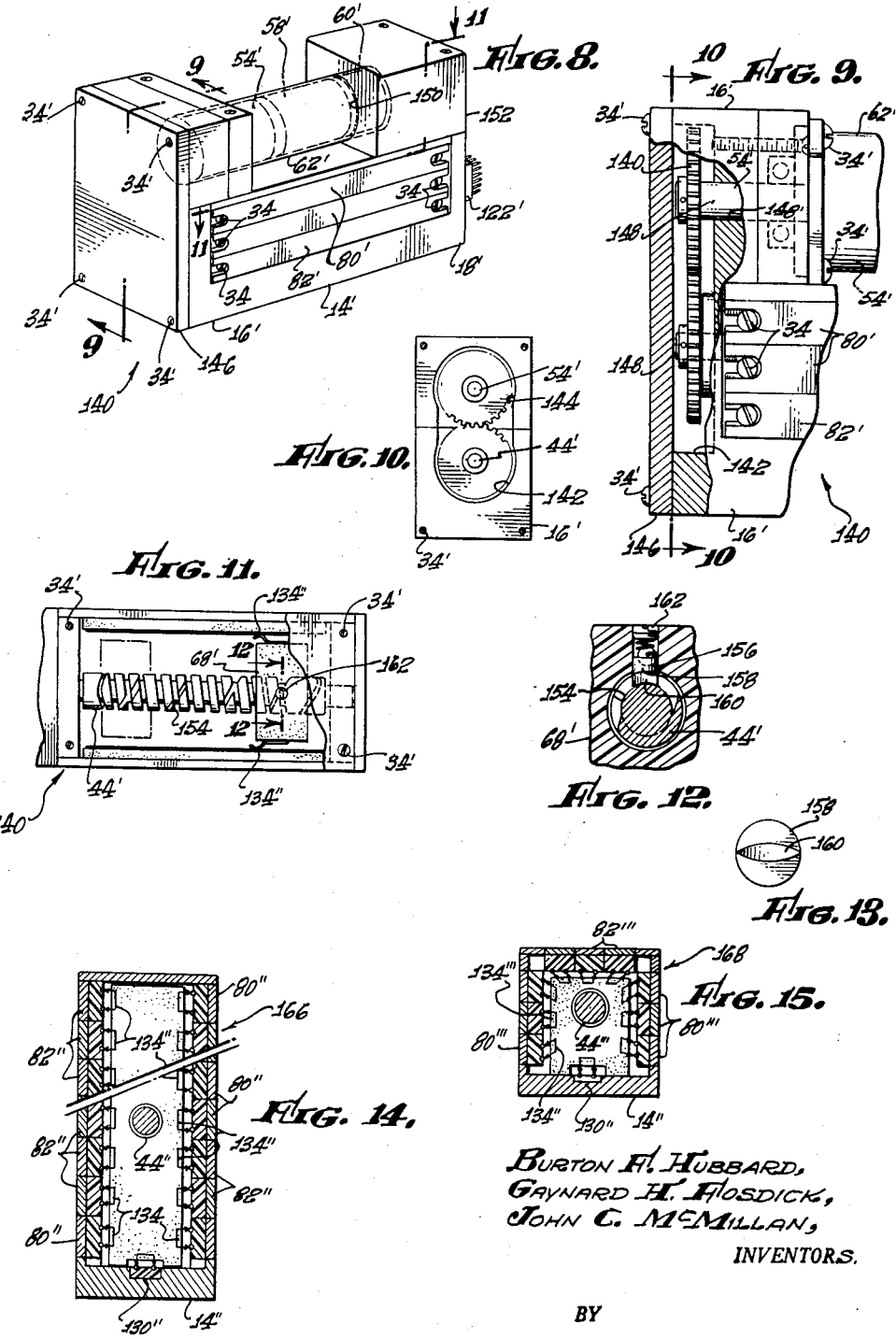

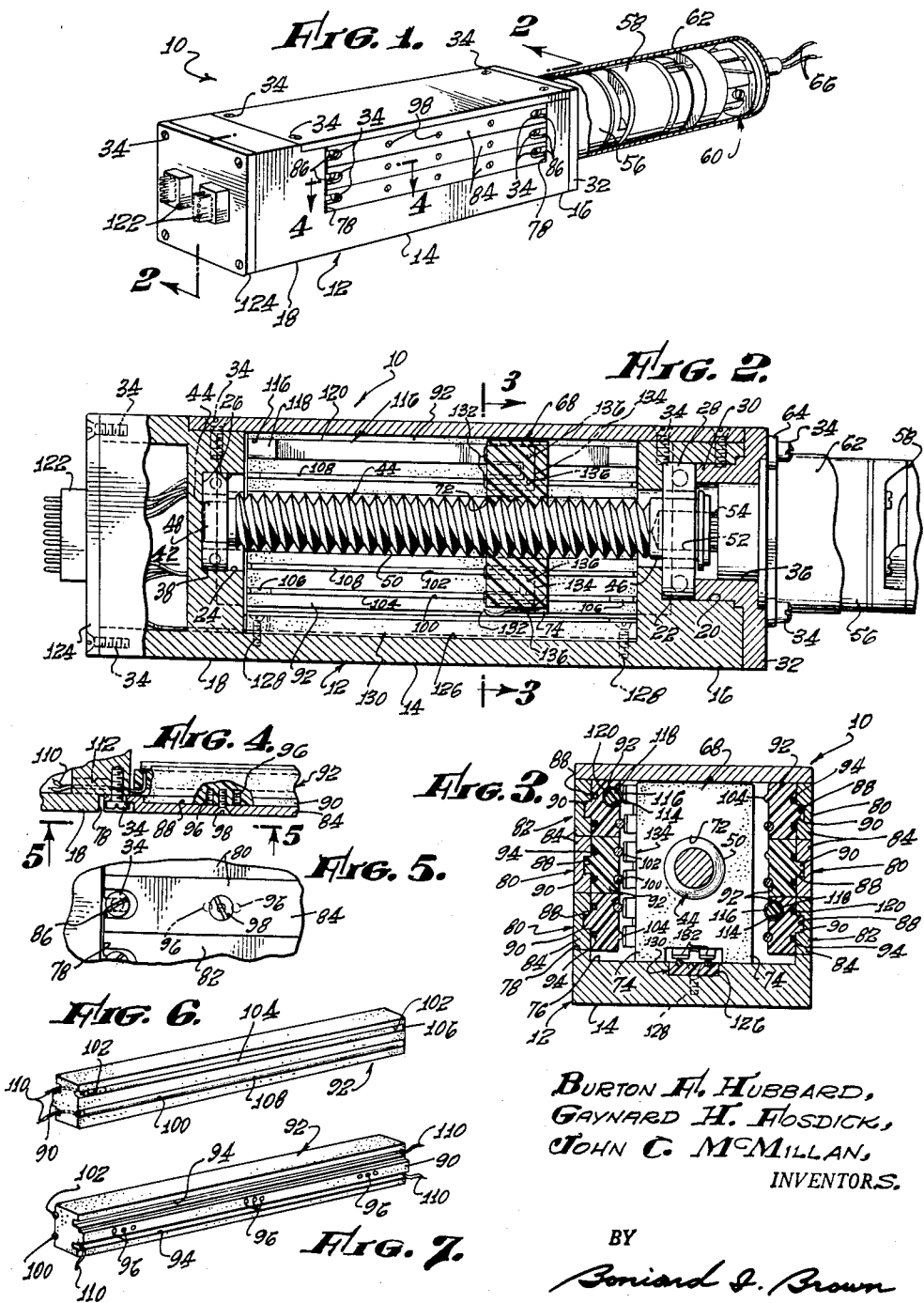

2,921,284

FUNCTION PROGRAMMERS

Gaynard H. Fosdick, Burton F. Hubbard, and John C. McMillan, Pomona, Calif.

Application March 23, 1956, Serial No. 573,490

17 Claims. (Cl. 338—116)

This invention relates generally to electrical control devices; more particularly it relates to electro-mechanical devices for programming a plurality of time-related electrical signals.

Modern automatic equipment and devices have produced a need for controls for coordinating the operations of different units to produce results in accordance with a predetermined program. The utilization of automation techniques in industry for control of industrial processes has created demand for such programming devices. Guided missiles require function programming devices to coordinate the operation of their component devices. Other examples of applications will readily occur to those versed in the art to which the present invention pertains. Compact size and cost economy are obviously to be desired in function programmers. In many applications, the devices must withstand adverse environmental conditions, such as shock, vibration, extremes of temperature, and foreign matter. Simplicity of construction and ease of adjustment are highly desirable.

Briefly summarized, the function programmer of this invention employs a shaft upon which there is mounted a travel block in such a manner that as the shaft is actuated this block is moved along a plurality of electrical elements so as to accomplish a program control function by adjusting or interconnecting certain electrically conductive means located on these electrical elements. It is considered obvious that electrical means coacting with the electrically conductive means on the electrical elements must be mounted upon the traveling block in order to accomplish the desired result from movement of the traveling block. The present invention provides a function programmer of this category utilizing physically linear electrical elements, these elements differing from one another as to the electrically conductive means located thereon. Thus, an electrical element of the present invention can be formed so as to include a linear or a non-linear resistance element designed to be operated as a rheostat, a linear or a non-linear resistance element and an electrical return designed to be operated together as a potentiometer, or a series of electrical conductors in such spaced relation as to be capable of serving as parts of a switch during movement of a traveling block. If an electrical element utilizes such electrical conductors this element may be termed a switching element, even if the electrical conductors are designed so that current is passed through such conductors during the principal portion of the movement of a traveling block. If desired, various combinations of the different types of electrically conductive means indicated can be employed on a single electrical element so as to accomplish specialized program controls. Various motor means may be utilized as a part of the invention to accomplish movement of a travel block employed as indicated in the preceding discussion. With one embodiment of the invention a shaft threaded in a single direction may be utilized so as to move a traveling block along an electrical element serving as a switching element so as to periodically reverse the direction of rotation of the motor means employed. Another embodiment of the invention utilizes motor means turning constantly in a given direction so as to accomplish a reciprocating motion for the traveling block employed by means of a shaft provided with a continuous thread extending in opposite directions around the shaft proper. In the latter case means are provided upon the traveling block which are capable of following the curved path of the thread on the shaft. If desired, this thread may be formed so as to accomplish movement of the traveling block at different rates of speed in different directions.

It is, therefore, an object of the present invention to provide function programmers which are simple to construct and adjust, and which operate reliably under adverse environmental conditions.

It is an object of this invention to provide function programmers which are easily alterable so as to selectively vary a control program.

It is an object of the present invention to provide small, lightweight electrical control instruments capable of functioning under conditions of shock and vibration.

It is an object of the present invention to provide interchangeable structures in a function programmer such that a variety of elements may be selectively employed to meet the demands of different applications without the necessity of designing a programmer for each application.

Another object of this invention is to provide electrical instruments of the category described in which the positions of the various electrical elements used may be readily adjusted so that errors in manufacturing or the like can be readily compensated for, and so that the units of this invention may be easily adjusted by a user so as to compensate for minor variations in the program control desired.

A further object of the present invention is to provide a function programmer utilizing physically linear electrical elements, these elements differing in the respective electrically conductive means located thereon.

Because of the nature of this invention, it is not considered necessary to set forth in any more detail by way of summary or objects the various specific features of this invention which are considered important from a commercial standpoint.

Other objects and features of the present invention as well as many advantages of it, will be apparent to those skilled in the art from a consideration of the remainder of this description, the appended claims, and the accompanying drawings in which:

Figure 1 is a perspective view, partially in section, of a function programmer of the present invention;

Figure 2 is a partial side elevational view taken at line 2—2 of Figure 1;

Figure 3 is a cross sectional view taken at line 3—3 of Figure 2;

Figure 4 is a partial cross sectional view taken at line 4—4 of Figure 1;

Figure 5 is a partial side elevational view taken in the direction of line 5—5 of Figure 4;

Figure 6 is a front or top view of an electrical element of a switching category employed with the function programmer shown in Figures 1, 2 and 3;

Figure 7 is a back view of the electrical element shown in Figure 6;

Figure 8 is a perspective view of a modified function programmer of the present invention;

Figure 9 is a side elevational view in which certain parts are shown in section corresponding to a sectional view taken at line 9—9 of Figure 8;

Figure 10 is a cross sectional view taken at line 10—10 of Figure 9;

Figure 11 is a partial sectional view taken at line 11—11 of Figure 8;

Figure 12 is a partial cross sectional view taken at line 12—12 of Figure 11;

Figure 13 is a view taken at line 13—13 of Figure 12 of the drawings; and

Figures 14 and 15 are diagrammatic views similar to Figure 3, illustrating two additional modified constructions according to the present invention.

In all figures of the drawings, like numerals are used to designate like parts wherever practicable for convenience of reference. It is to be understood that the present invention is not limited in any respect to the units illustrated in these drawings, since obviously many modifications may be made in the structures shown without departing from the essential features of the present invention. The function programmers illustrated are primarily intended to designate certain presently preferred constructions of this invention.

Referring to the drawings, and more particularly to Figures 1 and 2 thereof, there is shown a function programmer 10 of the present invention which includes a housing element 12 formed out of metal or the like and having an elongated bottom 14 to which are attached upstanding parallel front and rear ends 16 and 18. Within front end 16 is located cylindrical opening or aperture 20 having internal shoulder 22 formed therein; an axially aligned cylindrical recess 26 is formed in rear end 18 so as to have an annular cylindrical surface 24 located therein. A conventional ball bearing structure 28 is held against shoulder 22 by means of circular collar 30 formed on end plate 32. This end plate is attached to front end 16 by means of screws 34 and includes opening 36 bounded by collar 30. Within rear end 18 a second bearing structure 38 is mounted within recess 26 by being force-fitted against cylindrical surface 24. Extensions of rear end 18 define cavity 42, as shown.

A shaft 44 having smooth ends 46 and 48 held within bearing structures 28 and 38, respectively, is located so as to extend between these two ends 16 and 18 past the projecting end of collar 30. The portion of shaft 44 between ends 16 and 18 is provided with a thread 50 similar to a common screw thread and projecting a single direction around shaft 44. A small internally splined bore 52 is formed within end 46 of shaft 44 so as to receive a correspondingly shaped, splined shaft 54 extending from transmission 56.

This transmission is mounted, together with an electrical motor 58 and motor governor 60, within a generally cylindrical housing 62 attached to end plate 32 by means of screws 34, previously described, passing through holes (not shown) in flange 64 formed on one end of this housing 62. Motor 58, motor governor 60 and transmission 56 are all connected together in a conventional manner so that as motor 58 is actuated by current passing to this motor through connecting wires 66, shaft 54 is caused to rotate. This rotation is transmitted to shaft 44. As is best seen in Figure 2 of the drawings a portion of transmission 56 projects through opening 36 in end plate 32.

Rotation of shaft 44 is employed in function programmer 10 to cause linear movement of traveling block 68 between the front and rear ends 16 and 18. This motion is a result of threads 70 within aperture 72 in block 68 coacting with threads 50 formed upon shaft 44. Block 68 is preferably formed of a non-conductive material, such as nylon or the like, so that extensions 74 formed thereon normally ride against a planar surface 76 on bottom 14, as shown in Figure 3, preventing rotation of this block 68 as shaft 44 is turned.

Mounted in recess 788, formed in the sides of the ends 16 and 18, by means of screws 34 are electrical elements 80 and 82 used with function programmer 10.

Electrical elements 80 may be termed "switching elements" by reason of their function and construction; electrical elements 82 may be termed "potentiometer elements" because of their structure and function. All of elements 80 and 82 are formed so as to include an elongated, bar-like exterior mounting member 84 having slots 86 formed in the ends thereof. Thus, with this construction each of electrical elements 80 and 82 may be shifted a short distance between ends 16 and 18 after loosening the screws 34, so as to very accurately adjust the position of any of these elements. For reasons which will be more fully apparent, from description hereinbelow, electrical elements 80 and 82 are all parallel to shaft 44, and are all spaced from travel block 68 a short distance so as to be closely adjacent to this travel block. Thus, it is seen that adjustment of the position of electrical elements 80 and 82 enables these elements to be located in a predetermined physically linear relationship with one another. This relationship is interrelated with various positions of the traveling block 68 during rotation of the shaft 44.

In each mounting member 84 is formed an elongated groove 88 which is designed to hold a correspondingly shaped projection 90 formed upon an elongated non-conductive bar 92 employed with each of electrical elements 80 and 82. Bars 92 may conveniently be fabricated of such material as laminated phenolic composition or the like; each bar 92 includes two small grooves 94 located on each side of each projection 90 so as to extend the entire length of the bar. Each of projections 90 is provided with more than one series of closely spaced threaded holes 96 adapted for use in securing bars 92 to mounting members 84 by the use of small screws 98. It will be realized that these series of holes 96 provide another means in conjunction with slots 86 whereby the positions of electrical elements 80 and 82 may be varied for adjustment.

In Figures 6 and 7 of the drawings, the structure of a typical switching element 80 capable of being employed with the present invention is clearly indicated. Upon bar 92, employed in this switching element 80, there are preferably formed a semi-cylindrical groove 100 and a series of aligned grooves 102, the latter being of like size and shape. Groove 100 in bar 92 is parallel to and spaced from grooves 102. Between grooves 102, and in spaced parallel relation therewith, is semi-cylindrical elongated projection 104 of approximately the same radius as small electrical conductors 106, preferably in the form of common uninsulated wires, located within grooves 102. Another similar electrical conductor 108 is similarly located within groove 100 so as to extend therefrom. These conductors 106 and 108 are preferably of cylindrical shape and are affixed in the grooves specified by means of appropriate conventional adhesives or equivalent means. As shown in Figure 4, all of these conductors are connected to insulated wires 110 which extend around the ends of bars 92 employed with any of switching elements 80 of the invention. All of wires 110 so connected pass through small passages 112 into cavity 42; those leading from adjacent the end 16 pass through grooves 94.

Referring now to Figure 3, potentiometer elements 80 and 82 are structurally similar to switching elements 80 and differ from the switching elements solely in that grooves 102 and projections 104 are replaced by elongated cylindrical cavities, each having a cross-sectional area greater than half a circle, but having less cross-sectional area than a complete circle. Thus, with this construction elongated cylindrical resistance elements 116, employing non-conductive core 118 and a wire wound or other equivalent resistance material 120 positioned thereon, may obviously be easily arranged so as to extend beyond the side surface of each of bars 92 used with each of potentiometer elements 82 a distance approximately equal to the distance that each of conductors 108 extends.

With the construction described above resistance elements 116 are firmly mounted so that there is no danger of their being shaken loose from bars 92 during vibration, shock, or similar adverse environmental conditions. It is generally desirable to hold these resistance elements 116 against axial or longitudinal movement parallel to shaft 44 by means of a conventional adhesive. Resistance material 120 and conductors 108 employed with each of potentiometer elements 82 are preferably connected by means of insulated wires 110 in the manner in which an electrical return and an electrical resistance element are connected in any common adjustable potentiometer. Wires 110 extend from each of potentiometer elements 82 into cavity 42, as previously described.

Referring to Figure 2, all of these wires are grouped and connected to conventional electrical connectors 122 mounted upon plate 124 which is in turn secured to the rear end 18 by means of screws 34 so as to close cavity 42. Connectors 122, illustrated, are of the so-called male variety, but any type of equivalent structure may be mounted upon plate 124. Thus, it is possible for this invention to utilize virtually any sort of quick mounting means or plug or socket desired for commercial reasons without altering the basic structure of function programmer 10.

Referring to Figures 2 and 3, within groove 126 formed in bottom 14 between extensions 74 there is mounted by means of screws 128 a switching element 130 corresponding in construction to switching element 80, previously described. Element 130 and each of the other electrical elements 80 and 82, previously described, is designed to be separately engaged by spring-like arms 132 formed on a generally U-shaped electrical contact 134 of beryllium copper, platinum alloy, or the like. Each of contacts 134 is mounted upon travel block 68 by means of small pins or nails 136. Insulated wires 110 are employed with switching element 130, as previously indicated, and are connected to connectors 122.

The construction of function programmer 10 is preferably such that the opposed surfaces of ends 16 and 18 are arranged so as to limit the movement of the travel block along shaft 44. However, it is preferred to form switching element 130 so that conductors 106 employed therewith are located at the ends thereof. When this is done switching element 130 may be connected through the wires 110 and with it various external wiring (not shown) to the wires 66 so as to periodically cause the motor 58 to reverse its direction of rotation, causing the traveling block 68 to reciprocate back and forth between the ends 16 and 18.

A major feature of the present invention lies in the fact that conductors 106 used with switching elements can be made of any length, and any number of these conductors may be employed so as to accomplish virtually any desired sequential switching operation, turning on or off an electrical device controlled by a function programmer of the present invention. It is obviously possible to connect potentiometer elements 82 so as to use these potentiometer elements as variable resistors or rheostats. Further, resistance elements 116 may be of a non-linear electrical category, although it is normally preferred to use resistance elements having linear electrical characteristics. It is obviously possible, by simple modifications of an electrical element employed, to incorporate both a switching and a resistance structure into a single electrical element.

It is important to note specifically that each of arms 132 on contact 134 travels exactly the same distance, engaging electrically conductive means or parts upon the electrical elements 80, 82, and 130, employed during the operation of the function programmer 10. This means that this distance may be considered as a given time interval for a given rotational velocity of the shaft, and that various functions governed by these electrical elements may be correlated with one another with respect to a time sequence by appropriate proportioning of the lengths and locations of the electrically conductive means employed. Thus, it is quite simple to design and construct embodiments of this invention for virtually any type of programming operation in which several differently programmed electrical devices are to be simultaneously controlled in a continuous cyclic manner, the control program being repeated at a given time interval. For some operations, manual or other operation of shaft 44 may be employed, but this is not preferred since the invention is primarily designed for periodically repeating a series of operations in an accurate time sequence. Since the electrically conductive means employed are linear in physical configuration, the actual design and structure of these electrically conductive means is comparatively simple. Obviously, other electrically conductive means besides those shown, such as, for example, etched or printed circuit means, may be utilized. The number and electrical nature of the electrical elements employed with function programmer 10 may be altered as desired to meet particular requirements. Thus, in an extreme case all of these electrical elements could be either potentiometer or switching elements.

In Figures 8 through 11 of the drawings there is shown a modified function programmer 140 of the present invention which is similar in construction to the programmer 10 previously indicated. For convenience of reference, those parts of function programmer 140 which are the same as, or generally the same as, parts of function programmer 10 are designated by the primes of the numerals previously used in designating corresponding parts of programmer 10. Within function programmer 140 an enlarged flat cavity 142 designed to hold gears 144 constituting a gear train is formed within the front end 16'. This cavity 142 is closed by cover plate 146 attached to end 16' by screws 34'. One of gears 144 is secured by conventional means to an elongated end 148 on shaft 44' corresponding to end 46 on shaft 44 of programmer 10. The other of gears 144 is secured to shaft 54' extending from transmission 56' within housing 62' through opening 148' in end 16'. The end of housing 62' is mounted by screws 34' and has end 148 of shaft 44' extending through opening 148' in end 16', as shown. The end of housing 62' remote from this shaft 54' is supported within cylindrical opening 150 in metal block 152 mounted upon rear end 18' so that air may readily circulate around housing 62' to dissipate heat. Block 152 also serves to conduct heat from housing 62 to facilitate its dissipation into the atmosphere.

Referring to Figure 11, shaft 44' between ends 16' and 18' is provided with groove 154 corresponding to thread 50; this groove 154 may be termed a thread. It extends continuously in a spiral manner about shaft 44' so as to be threaded in opposite directions about this shaft. Further, the pitch of groove 154 in one of these directions is greater than the pitch in the other direction in the preferred embodiment of the invention so that motor 58' can operate at a constant speed in one direction only while moving travel block 68' at different speeds in different directions.

In order to move this traveling block 68' there is provided therein, as indicated in Figures 12 and 13 of the drawings, cylindrical opening 156 leading into aperture 62'. Within this opening is held a small rotatable cylindrical member 158 having elongated projection 160 formed thereon so as to fit within the groove 154. A plug 162 is attached by means of threads within opening 156 so as to hold member 158 in place with projection 160 extending into groove 154 of shaft 44'. If desired a spring may be located between plug 162 and this member 156, as shown. The sides of projection 160 are preferably curved as illustrated so that it can follow within the continuous groove 154 without binding. This type of thread and groove construction is very advantageous with this invention.

In Figures 14 and 15 of the drawings are shown, in schematic form, other modified function programmers, 166 and 168, of the present invention. For convenience of reference, parts of these units corresponding to the parts of function programmer 10 are designated by double or triple primes of the same numerals employed in the preceding discussion. The two constructions illustrated in Figures 14 and 15 are primarily intended to illustrate that virtually any number of electrical elements can be employed with the invention, and that, further, these elements can be disposed in a variety of different manners along different sides of a traveling block. The modified function programmers of the present invention can be altered or modified as indicated in the discussion of function programmer 10, and are primarily designed to be operated in substantially the same manner as programmer 10.

Those skilled in the art will realize that a number of modifications may be made in construction without departing from the essential features of the present invention; the embodiments indicated in Figures 14 and 15 are examples of such modifications. Another example would be an embodiment wherein the electrical elements are arranged upon the inner surface of a cylindrical housing and a travel block of corresponding configuration is employed.

Although specific embodiments of the present invention have been described and illustrated in detail, it is to be clearly understood that the same is by way of illustration and example only; it is to be understood that the invention is not limited thereto, as many variations will be readily apparent to those versed in the art and the invention is to be given its broadest possible interpretation within the terms of the following claims.

We claim:

1. A device of the class described, comprising: housing means defining a cavity and having ends, said ends having aligned apertures formed therein and being connected to one another; a shaft held within said apertures and extending across said cavity; a travel block mounted on said shaft within said cavity so as to be capable of movement between said ends; a plurality of electrical elements positioned so as to extend parallel to said shaft between said ends, said elements being adjustably mounted so as to face said travel block and being located adjacent to said block, at least some of said electrical elements varying in length and electrical conductivity; and a plurality of electrical contacts mounted on said block so as to engage different portions of said electrical elements as said block is moved between said ends.

2. A device of the class described, comprising: housing means defining a cavity and having ends, said ends having aligned apertures formed therein and being connected to one another; a shaft held within said apertures and extending across said cavity; motor means operatively connected to said shaft for rotating said shaft; a travel block mounted on said shaft within said cavity so as to be capable of movement between said ends; a plurality of electrical elements positioned so as to extend parallel to said shaft between said ends, at least some of said electrical elements varying in length and electrical conductivity, said elements being adjustably mounted so as to face said travel block and being located adjacent to said block; and a plurality of electrical contacts mounted on said travel block so as to engage different successive portions of said electrical elements as said block is moved between said ends.

3. A device of the class described, comprising: housing means defining a cavity having ends, said ends having aligned apertures formed therein and being connected to one another; a shaft mounted within said apertures and extending across said cavity, said shaft having continuous threads extending in opposite directions around said shaft; a travel block disposed within said cavity so as to be capable of movement between said ends; means located on said block for engaging said continuous thread; a plurality of electrical elements positioned so as to extend parallel to said shaft between said ends, said elements being mounted so as to confront said block and being adjacent to said block; and a plurality of electrical contacts mounted on said block so as to engage different successive portions of said electrical elements as said block is moved between said ends.

4. A function programmer of the class described, comprising: a structure having a wall and upstanding ends attached thereto, said wall having a planar surface on the side thereof adjacent to said ends, said ends having aligned openings formed therein; a shaft rotatably mounted within said openings and extending between said ends, the portion of said shaft between said ends being threaded; a non-conductive traveling block, having an aperture formed therein and having extensions formed thereon, positioned between said ends so that said shaft extends through said aperture in said block and so that said extensions engage said planar surface so as to prevent rotation of said block; follower means on said block engaging said threaded portion of said shaft for producing movement of said block upon rotation of said shaft; a plurality of electrical elements mounted on said ends so as to extend parallel to said shaft between said ends, said elements being spaced from said travel block, each of said electrical elements including a non-conductive support and electrically conductive means facing said shaft, said electrically conductive means extending parallel to said shaft, at least some of said electrically conductive means varying in length and in electrical conductivity; and a plurality of resilient contact brushes mounted on said travel block, each of said contacts including resilient arms adapted for engaging said electrically conductive means on said electrical elements during movement of said travel block between said ends.

5. The function programmer of claim 4 and further including motor means operatively connected to said shaft for rotating said shaft.

6. An electrical instrument comprising: a base structure having a wall and upstanding opposed ends attached thereto, said wall having a planar surface on the side thereof adjacent to said ends, said ends having aligned openings formed therein; a shaft rotatably mounted within said openings so as to extend between said ends, said shaft being parallel to said planar surface; a non-conductive travel block, having extensions formed thereon, positioned between said ends and engaging said shaft, said extensions engaging said planar surface so as to prevent rotation of said block; a plurality of electrical elements adjustably mounted on said ends so as to extend between said ends parallel to said shaft, said electrical elements being adjacent to and spaced from said travel block, each of said electrical elements including a non-conductive base and at least one electrical conductor extending parallel to said shaft between said ends a distance corresponding to the distance said traveling block is moveable between said ends, at least one of said electrical elements further including an electrical resistance element extending parallel to said shaft, and at least one of said electrical elements also including at least one other electrical conductor, said other electrical conductor extending parallel to said shaft for a distance less than the distance through which said traveling block is capable of movement between said ends; and a plurality of electrically conductive contact means mounted on said traveling block, each of said contact means being adapted to engage electrically conductive portions of one of said electrical elements.

7. A device of the class described, comprising: means defining a cavity and having parallel ends, said ends having aligned apertures formed therein; means connecting said ends to maintain said ends in spaced relation; a shaft rotatably mounted within said apertures and extending across said cavity, the portion of said shaft within said cavity being threaded; a travel block having a threaded aperture positioned upon said shaft within said cavity, said threaded portion of said shaft engaging the threads within said aperture; a plurality of electrical contact brushes mounted on said traveling member so as to extend therefrom; a plurality of electrical elements adjustably mounted on said ends so as to extend between said ends of said cavity, said electrical elements being parallel to one another and being parallel to said shaft, said electrical elements being separately mounted and being disposed adjacent to and spaced from said travel block so that as said travel block is moved within said cavity each of said electrical elements is engaged by one of said electrical contact brushes, and motor means connected to said shaft for rotating said shaft; and means for periodically reversing the direction of rotation of said shaft.

8. A function programmer of the class described, comprising: means defining an elongated cavity having ends, said ends having aligned apertures formed therein; wall means connecting said ends to hold said ends in fixed spaced relation with one another; a shaft rotatably mounted within said apertures so as to extend from one of said ends to the other of said ends across said cavity, said shaft being spaced from the walls of said cavity, the portion of said shaft within said cavity being threaded; a travel block having a threaded aperture formed therein mounted on said shaft so that said shaft extends through said aperture with the threads on said shaft engaging the threads within said aperture; a plurality of electrical elements each including electrically conductive means facing said block, said electrically conductive means on different electrical elements varying in length and in electrical conductivity and being mounted on said ends so as to extend parallel to said shaft between said ends, said electrical elements being located adjacent to said block and being spaced from said block; and a plurality of electrical contact brushes mounted on said block so as to engage different successive portions of said electrical elements as said block is moved between said ends.

9. A function programmer of the class described, comprising: a structure having a wall and upstanding ends attached thereto, said wall having a planar surface on the side thereof adjacent to said ends, said ends having aligned openings formed therein; a shaft rotatably held within said openings so as to extend between said ends, the portion of said shaft between said ends being threaded in a single direction; a non-conductive travel block, having a threaded aperture formed therein and having extensions formed thereon, positioned between said ends so that said shaft extends through said aperture in said block and so that said threads on said shaft engage said threads within said aperture and so that said extensions slidably engage said planar surface so as to prevent rotation of said block, said block being formed of a non-conductive material; a plurality of electrical elements mounted on said ends so as to extend parallel to said shaft between said ends, said electrical elements being spaced from said traveling block, each of said electrical elements being formed so as to include a non-conductive support and electrically conductive means facing said shaft, said electrically conductive means extending parallel to said shaft, at least some of said electrically conductive means varying in length and in electrical conductivity; and a plurality of resilient metal contact brushes mounted on said travel block, each of said contact brushes including resilient arms designed to engage said electrically conductive means on said electrical elements during movement of said travel block between said ends.

10. An electrical instrument comprising: means defining a cavity having ends, said ends having aligned apertures formed therein; a shaft rotatably held within said apertures so as to extend across said cavity, the portion of said shaft within said cavity being provided with a continuous thread extending in opposite directions around said shaft; a travel block movably mounted within said cavity; follower means on said block so as to engage said thread on said shaft, whereby as said shaft is turned continuously in one direction said travel block is caused to move within said cavity in a reciprocal manner through the engagement of said projection means with said thread on said shaft; a plurality of electrical elements mounted adjacent to and spaced from said traveling block so as to extend between said ends; contact means on said travel block for engaging said electrical element, and means for adjusting said elements in a direction parallel to said shaft.

11. An electrical instrument comprising: means defining a cavity having ends, said ends having aligned apertures formed therein; a shaft rotatably mounted within said apertures so as to extend across said cavity, the portion of said shaft within said cavity being provided with a continuous thread extending in opposite directions around said shaft; a travel block having an aperture formed therein positioned within said cavity so that said shaft extends through said aperture in said block; follower means mounted on said block so as to engage said thread on said shaft, whereby as said shaft is turned continuously in one direction said traveling block is caused to move within said cavity in a reciprocal manner through the engagement of said projection means with said thread on said shaft; an electrical element mounted adjacent to and spaced from said travel block so as to extend parallel to said shaft; and means adapted to engage said electrical element mounted on said traveling block, said mans being movable with respect to said electrical element as said traveling block moves within said cavity.

12. An electrical instrument comprising: means defining a cavity having ends, said ends having aligned openings formed therein; a shaft held within said openings so as to extend across said cavity, the portion of said shaft within said cavity being provided with a continuous thread extending in opposite directions around said shaft; motor means mounted on said means defining a cavity so as to be located outside said cavity, said motor means being connected to said shaft so as to be capable of rotating said shaft continuously in a given direction; a travel block having an aperture formed therein positioned within said cavity so that said shaft extends through said aperture in said block; follower means rotatably mounted within said block so as to engage said thread on said shaft whereby as said shaft is turned continuously in said given direction said traveling block is caused to move within said cavity in a reciprocal manner through engagement of said follower means with said thread on said shaft; an electrical element mounted adjacent to and spaced from said travel block so as to extend parallel to said shaft; and contact means mounted on said travel block so as to engage different portions of said electrical element as said motor means causes said shaft to rotate, said contact means being electrically insulated from said electrical element.

13. An electrical instrument comprising: a structure having opposed ends and a wall connecting said ends to one another, said ends having aligned openings formed therein; a shaft rotatably held within said openings so as to extend between said ends, the portion of said shaft between said ends being provided with a continuous thread extending in opposite directions around said shaft; a travel block, having an aperture formed therein, positioned between said ends so that said shaft extends through said aperture in said block; elongated follower means mounted on said block so as to be capable of rotation with respect thereto located so as to engage said thread on said shaft whereby as said shaft is turned continuously in a given direction said travel block is caused to move between said ends in a reciprocal manner; a plurality of electrical elements mounted on said ends parallel to said shaft so as to extend between said ends, said electrical elements being spaced from said traveling block; contact means mounted on said traveling block so as to engage different portions of said electrical elements as said shaft is rotated, said contact means and said electrical elements each being insulated from one another; and means for preventing rotation of said traveling block.

14. An electrical instrument comprising: a structure having a wall and upstanding opposed ends attached thereto, said wall having a planar surface on the side thereof adjacent to said ends, said ends having aligned openings formed therein; a shaft held within said openings so as to extend parallel to said surface between said ends, the portion of said shaft between said ends being provided with a continuous thread, portions thereof extending in opposite directions around said shaft; a non-conductive travel block, having an aperture formed therein and having extensions formed thereon, positioned between said ends so that said shaft extends through said aperture in said block and so that said extensions engage said surface so as to prevent rotation of said block; means defining an opening in said travel block connecting the exterior of said block with said aperture; a follower member having a curved, elongated section mounted within said opening in said block so that said section engages said thread on said shaft; means positioned within said opening in said block for urging said section of said follower member against said thread so that when said shaft is turned continuously in a given direction said travel block is caused to move in a reciprocal manner; a plurality of electrical elements mounted on said ends so as to extend between said ends parallel to said shaft, said electrical elements being adjacent to and spaced from said travel block, each of said electrical elements being separate, at least one of said electrical elements including a resistance element and an electrical return, and at least one of said electrical elements including an electrical conductor extending in a continuous path and one or more electrical conductors located so as to be aligned with one another, all of said electrically conductive parts of said electrical elements being mounted on non-conductive bases; and a plurality of electrically conductive contact means being adapted to engage two electrically conductive portions of one of said electrical elements simultaneously for at least a portion of the travel of said traveling block.

15. A function programmer comprising: housing means defining a cavity having ends, said ends having aligned apertures formed therein and being connected to one another; an actuating shaft mounted within said apertures and extending across said cavity, a portion of said actuator shaft between said ends being threaded; motor means having a motor shaft in parallel spaced relation with said actuator shaft; transmission means interconnecting said motor shaft and said actuator shaft; a travel block disposed within said cavity for movement between said ends; means on said block for engaging said threaded portion; a plurality of electrical elements positioned in parallel relation with said actuator shaft, said elements being mounted so as to confront said block in being adjacent thereto; and a plurality of electrical contacts mounted on said block to engage different successive portions of said electrical elements upon movement of said block between said ends.

16. A function programmer comprising: housing means defining a cavity having ends, said ends having aligned apertures formed therein and being connected to one another; an actuating shaft mounted within said apertures and extending across said cavity, said shaft having continuous threads extending in opposite directions around said shaft; motor means having a motor shaft in parallel spaced relation with said actuator shaft; transmission means interconnecting said motor shaft and said actuator shaft; a travel block disposed within said cavity for movement between said ends; means on said block for engaging said threaded portion; a plurality of electrical elements positioned in parallel relation with said actuator shaft, said elements being mounted so as to confront said block in being adjacent thereto; and a plurality of electrical contacts mounted on said block to engage different successive portions of said electrical elements upon movement of said block between said ends.

17. An electrical instrument comprising: means defining a cavity having ends, said ends having aligned apertures formed therein; a shaft rotatably held within said apertures so as to extend across said cavity, the portion of said shaft within said cavity being provided with a continuous thread extending in opposite directions around said shaft, the pitch of said thread in one of said directions being different from the pitch of said thread in the other of said directions; a travel block movably mounted within said cavity; follower means on said block so as to engage said thread on said shaft, whereby as said shaft is turned continuously in one direction said travel block is caused to move within said cavity in a reciprocal manner through the engagement of said projection means with said thread on said shaft; an electrical element mounted adjacent to and spaced from said traveling block so as to extend between said ends; contact means on said travel block for engaging said electrical element; and means for continuously rotating said shaft in a given direction.

References Cited in the file of this patent

UNITED STATES PATENTS

| | | |
|---|---|---|
| 2,055,766 | Hunt | Sept. 29, 1936 |
| 2,687,463 | Riley | Aug. 24, 1954 |

FOREIGN PATENTS

| | | |
|---|---|---|
| 679,393 | Germany | Aug. 4, 1939 |